May 25, 1937.  C. B. KIDNEY  2,081,542
CONTROLLING APPARATUS
Filed Jan. 30, 1935
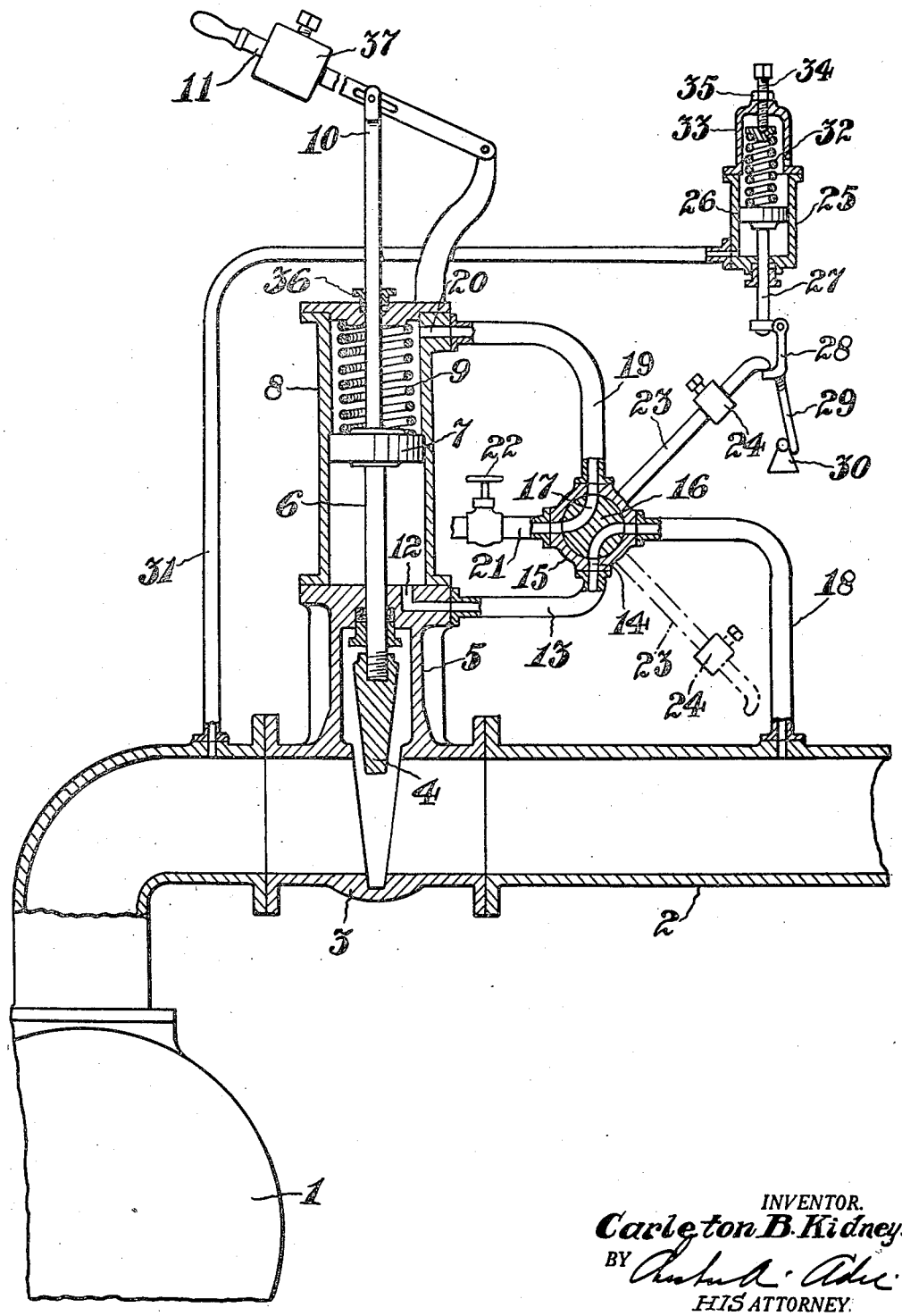
INVENTOR.
Carleton B. Kidney.
BY
HIS ATTORNEY.

Patented May 25, 1937

2,081,542

UNITED STATES PATENT OFFICE 2,081,542

CONTROLLING APPARATUS

Carleton B. Kidney, West Brighton, Staten Island, N. Y., assignor to Ingersoll-Rand Company, Jersey City, N. J., a corporation of New Jersey Application January 30, 1935, Serial No. 4,004

1 Claim. (Cl. 137—153)

This invention relates to improvements in controlling apparatus, and particularly to controlling means for installations having conduits by which a compressed fluid medium is delivered to suitable power-driven apparatus to enable the latter to be operated thereby.

An object of the invention is to provide a simple and efficient means by which such a conduit can be cut off when necessary from the source of the power medium, and which is so constructed that said medium itself can produce the desired result at the proper moment. Thus no additional motive agent or connections therefor are required.

The invention is especially adapted for use in systems having a compressor that forces air through a transmission pipe or conduit to a number of working units. Such a transmission line may break now and then, or under some conditions the flow of the fluid power medium through the conduit may be reversed, and for the time being the load on the compressor becomes unsteady and is greatly increased.

Another object of the invention is to provide means which in an eventuality of this kind automatically interrupts communication between the compressor and the transmission line; the arrangement being such that the breaking of the communication between the compressor and the discharge conduit is brought about by a change in the pressure of the power medium in said conduit.

These and other objects and advantages are set forth in the description and the novel features are pointed out in the appended claim. But the disclosure is illustrative only and numerous changes may be made in practice without departing from the principle of the invention or exceeding the scope and spirit of the terms in which the appended claim is expressed.

On the drawing the figure shows in outline a sectional view of an apparatus according to this invention.

The numeral 1 indicates a compressor, such as a centrifugal blower, which delivers compressed air to a conduit or transmission pipe 2. This pipe will conduct the compressed air to a number of drills or other machines to be operated thereby. In the line of the pipe 2 is a valve casing 3 containing a suitable valve element 4. This valve is open when the compressor is working and normally it stays open, but in case the pressure in the conduit 2 from any cause drops to a predetermined point the valve means 4 is then actuated to close the conduit.

The casing 3 is shown as having a neck or extension 5 into which the valve is moved when the conduit 2 is open. The valve has a stem 6 which extends through the end of the neck 5 and carries a piston 7 on its outer extremity. This piston is arranged to move in a cylinder 8 and between the piston and one end of the cylinder is a spring member 9. This spring tends to move the valve toward closed position, and when the cylinder 8 is vertical the weight of the valve and the piston tend to have the same effect. To open the valve and to keep it open a force opposing the spring 9 and the action of gravity is necessary. As shown the piston 7 may have a rod 10 which passes through an opening in the outer end of the cylinder 8 and is attached to a pivoted lever 11, so that the valve can be opened by hand when the compressor is first started.

The cylinder 8 has a port 12 in its end on the side of the piston toward the valve 4 and this port 12 communicates through a pipe 13 with a port 14 in the casing 15 of a rotary valve 16. The casing has four ports and the valve has two passages 17. The port to the right of the above mentioned port 14 is connected by a pipe 18 to the conduit 2 beyond the valve 4 and the port directly above the port 14 is connected through a pipe 19 to a port 20 in the cylinder on the side of the piston 7 engaged by the spring 9. The remaining port in the valve casing 15 which is to the left of the first-named port 14 communicates with an exhaust pipe 21 having a check valve therein operable by an outside knob or handle 22. It is obvious that with the parts in the positions shown on the drawing, the pressure of the compressed air in the conduit 2 takes effect through the pipes 18 and 13 to hold the piston 7 up and keep the valve open.

The valve 16 has an outside arm 23 affixed thereto with an adjustable or slidable weight 24 thereon. At 25 is a cylinder having a piston 26 therein with a stem 27 projecting through one end and carrying a pivoted trip-catch 28. This cylinder is above the arm 23 and the catch 28 has a finger 29 to engage a fixed stop 30 to move this catch. As shown, the catch can swing to the right so that when the arm 23 is lifted it can pass this catch, which can then be hooked on to the end of the arm 23 to hold this arm in raised position and the valve 16 in the position shown. If the piston 26, however, is now lowered, the finger 29 will be pushed by the stop 30 to the right and the catch tripped so that the arm 23 is released. It will then drop into the position shown in dot-and-dash lines so as to shift the controlling device or valve 16 and connect the pipe 13 to the pipe 21 and the pipe 18 to the pipe 19.

The cylinder 25 is connected at its lower end through a pipe 31 with the conduit 2 at a point between the compressor 1 and the valve 4. The piston 26 tends to be depressed by a spring 32 which engages one end of the piston 26 and has a head 33 at the other end which abuts the inner end of a screw 34 in the upper end of the cylinder 25, this screw being held fast by a lock nut 35. So long as the entire apparatus is working properly the piston 26 is kept raised, but if the pressure drops for any reason the spring 32 can then force down the piston 26 and the latch 28 to release the weighted arm 23 to connect the pipe 18 with the pipe 19, and the pipe 13 to the pipe 21, as above stated. The pressure in the conduit 2 is now exerted in the cylinder 6 through the port 20 above the piston 7 and the space in the cylinder 6 below the piston 7 will be exhausted into the atmosphere. Thus the valve can be forced down to closed position.

In operation when the compressor is started the valve 4 is partly opened with the manually operated member 11 and the arm 23 is latched and held by the part 28. When the blower starts up the pressure in the conduit 2 will actuate the motor means including the piston 7 higher and force the valve to full open position, the top of the cylinder 6 now being exhausted by way of the pipes 19 and 21. The pressure in the conduit now takes effect through the pipe 31 and holds the piston 26 in raised position. If, however, there is a break in the conduit 2 and the pressure drops as a result thereof, the spring 32 of the releasing means can force down the piston 26 unlatching the arm 23. The lower half of the cylinder 6 is now exhausted and the pressure in the conduit 2 takes effect to lower the piston 7 and valve 4. Likewise, if from any cause the flow of the compressed air tends to be reversed in the conduit 2, a drop in pressure therein takes place, and such a drop, even if temporary, will at once enable the piston 26 to release the arm 23. The conduit 2 will then be closed as before.

It will be seen that the above apparatus is very simple in design and operation and is governed by the pressure of the power medium itself in the conduit 2. It can also be controlled by the pressure of the oil for the compressor 1, the pressure of steam, in case a steam engine drives the compressor 1, loss of power if the compressor is electrically operated, the power which would be needed to run an electric motor, or by the speed of the compressor or unit which actuates it. With any of these forms of power the mechanism could easily be disposed to hold and release the piston 26 so as to enable the pressure in the conduit to move the valve as required.

Of course a valve different from the valve of the gate type such as is shown at 4 might be employed, and the apparatus will work just as well with a rotatable plug valve, for the piston 6 could easily be connected to turn such a valve to open or closed position.

The rod 10 is encircled by the spring 9 and it passes through the outer end of the cylinder 6 in an air-tight bearing 36 which permits reciprocation of this rod. The lever may carry a weight member 37 which is adjustable like the weight 24. To move the valve away from closed position the lever 11 has to be lifted only slightly. Spring 9 may be omitted and reliance placed upon the weight 37 together with the weight of the valve and piston 7, or the spring may be included when desired, and then the valve will close and be held shut even if the pressure on the top of the piston 7 were absent. Of course, if the parts are mounted in such position that the movement of the valve is not vertical the spring 9 becomes quite necessary.

I claim:

Apparatus comprising a conduit to receive a pressure fluid, a valve to close the conduit when the pressure of the fluid fails, a motor to actuate the valve, ducts diverting fluid from the conduit to the motor to operate the latter, a second valve in the ducts governing the admission of fluid to the motor, said second valve having a weighted arm affixed thereto for moving the same, means including a latch engageable with the arm, said means being dependent upon normal pressure fluid to hold the arm and latch in engagement and thereby hold the arm and second valve in a substantially fixed position, said means also including a member tending to disengage the latch and arm, whereby when said pressure fails said member effects disengagement of the latch and arm, the arm upon disengagement with the latch operating freely to immediately alter the position of said second valve to cause the motor to actuate the first valve to closing position.

CARLETON B. KIDNEY.